United States Patent [19]
Alexander et al.
[11] 3,959,059
[45] May 25, 1976

[54] METHOD AND APPARATUS FOR FLOCKING CONTINUOUS WEBS

[76] Inventors: Leon Rollin Alexander, 4335 Andy St., Lakewood, Calif. 90712; Donald F. Dreher, P. O. Box 177, East Brookfield, Mass. 01515

[22] Filed: Sept. 6, 1972

[21] Appl. No.: 286,644

Related U.S. Application Data

[63] Continuation-in-part of Ser. No. 706,707, Feb. 16, 1968, abandoned, which is a continuation of Ser. No. 504,407, Oct. 24, 1965, abandoned.

[52] U.S. Cl. .......... 156/244; 156/276; 156/285; 156/382; 156/498; 156/500; 427/200; 427/206

[51] Int. Cl.² .......... B29F 3/00

[58] Field of Search .......... 156/62.2, 244, 272, 156/276, 279, 285, 498, 500, 62.4, 166, 167, 176, 178, 382; 117/16

[56] References Cited

UNITED STATES PATENTS

| | | | |
|---|---|---|---|
| 2,687,363 | 8/1954 | Manning | 156/167 |
| 2,897,874 | 8/1959 | Stalego et al. | 156/62.2 |
| 3,219,507 | 11/1965 | Penman | 156/279 |
| 3,347,727 | 10/1967 | Bobkowicz et al. | 156/244 |
| 3,421,964 | 1/1969 | Arbit | 156/244 |
| 3,449,187 | 6/1969 | Bobkowicz | 156/244 |

*Primary Examiner*—Caleb Weston

[57] ABSTRACT

This application discloses methods reflected in specialized apparatus for application of a flocked covering to the receptive surface of a formed base, such as that of a thermoplastic film concatenate with its extrusion, to produce a flocked composite web. A vacuous foraminous conveyance provides positive means for transferring flock to the base and influencing the depth of embedment.

16 Claims, 5 Drawing Figures

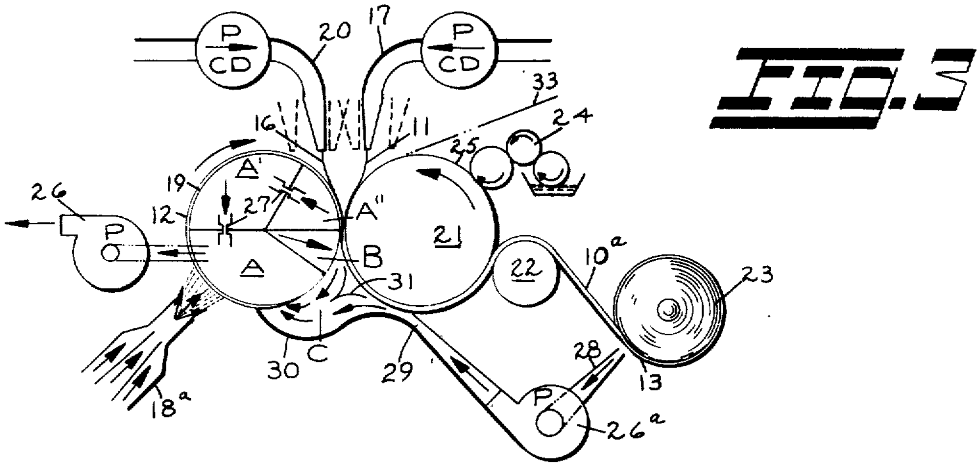
FIG. 3
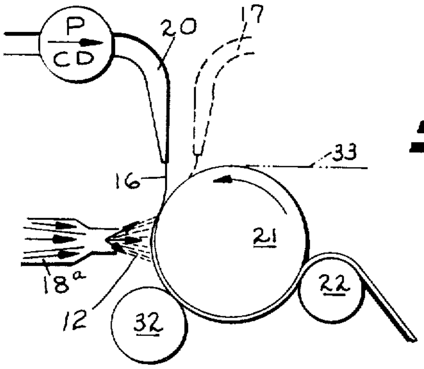
FIG. 4
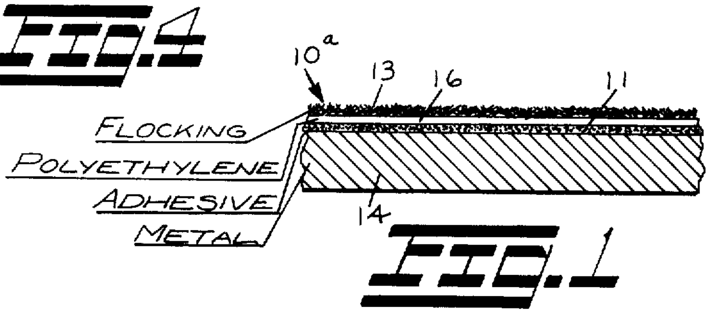
FIG. 1
FIG. 2
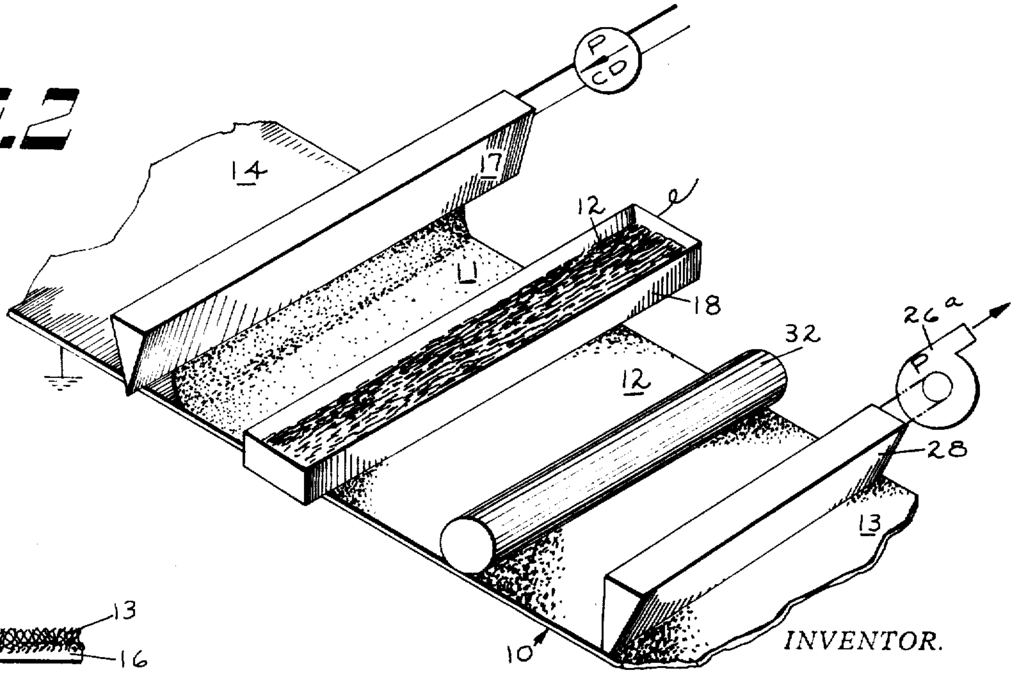
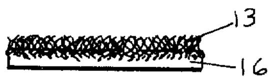
FIG. 5
INVENTOR.
LEON ROLLIN ALEXANDER.
DONALD F. DREHER.

METHOD AND APPARATUS FOR FLOCKING CONTINUOUS WEBS

CROSS-REFERENCE TO RELATED APPLICATIONS

This is a continuation-in-part of Ser. No. 706,707, filed Feb. 16, 1968, now, abandoned, which was a streamlined continuation of Ser. No. 504,407, filed Oct. 24, 1965, abandoned.

It derives in part from U.S. Pat. No. 3,502,207 which matured from Ser. No. 556,250, filed Apr. 19, 1966 which was a continuation-in-part of Ser. No. 191,598, filed May 1, 1962.

BACKGROUND OF THE INVENTION

This invention relates to the protective covering of sheets of metal, plastic and the like, and more particularly to means whereby flocked coverings may be applied economically to flexible films to render them controllably pliant and distensible.

The above-identified patent discloses a protective covering comprising a filmlike adhesive layer with a flocked backfacing, adapted to being rolled upon itself without an interliner, unwound from the roll and applied to elongate strips of metal which thence may be coiled and later unwound and segmented, requiring ideally that the protective covering be capable of linear enlargement and/or reduction to permit changes in curvature of the surface-protected metal sheet without jeopardy, e.g., buckling, severing or excessive creep of the protective covering as often occurs when relatively non-pliant and non-distensible coverings are used. Although creped coverings could be circumvent this deficiency, they are seldom used in the application described due to increased cost and a tendency to image the surface pattern of the adhesive onto the metal sheet.

SUMMARY OF THE INVENTION

The present invention describes a further improvement in protective coverings over that originally disclosed in the related prior patent, by interposing a filmed layer of distensible material such as polyethylene between the adhesive layer and the flocked backfacing, the combination increasing the effectiveness of such coverings and leading to simplified methods of manufacture as disclosed herein, which contribute to reduction in overall cost.

Therefore the primary objects of the present invention are to improve products of the character described and to disclose new and novel methods for their manufacture.

A corollary objective is to provide specialized apparatus for effecting use of the described processes.

Another objective derived therefrom is the flocking of polyethylene and similar thermoplastic compositions using such new and novel methods, and the production thereby of product having some of the qualities of polyethylene extrusion-coated papers, but being more pliant and distensible.

A further objective is to provide effective protection for highly-finished sheet surfaces during forming and drawing operations, to which the products of the instant invention are well adapted.

These and other objects of the present invention may better by understood by referral to the accompanying drawings, in which character references common to the several applications are similar.

BRIEF DESCRIPTION OF THE DRAWING

FIG. 1 is an enlarged cross section of the described product attached to a segment of metal sheet.

FIG. 2 is an overhead perspective view showing the application of adhesive and flocking directly to a movingly-conveyed strip of metal.

FIG. 3 is a schematic illustration showing manufacture of the composite product utilizing dual extrusion heads and flocking application by means of cylindrical former.

FIG. 4 is a schematic illustration showing a film extruder with following application of fiber segments by flocking gun.

FIG. 5 is a greatly enlarged cross section of a segment of product showing interfaced embedment of random fibers and penetration of elastomer.

DESCRIPTION OF THE PREFERRED EMBODIMENTS

Referring to FIG. 1, there is shown a discrete covering of flock 13 disposed on the upper surface of a polyethylene film 16 with an underlying layer of adhesive 11, the composite product 10$^a$ being attached self-adhesively to the supporting sheet of metal 14.

FIG. 2 is illustrative of one manufacturing process suggested in the prior patent application except that in this instance the protective covering elements are being applied to a traveling strip of metal 14, the adhesive composition 11 curtain coated at 17 and the flocking 12 applied electrostatically at 18 to the adhesive's still-receptive upper surface, the combination 10 thence subjected to roller compression 32 and followed by vacuum cleaning 28 to remove the excess and unanchored segments of flock. By such means it will be apparent that the protective covering elements may be combined concomitantly with their application to the subject material, thereby offering considerable economies by the use of such process.

FIG. 3 illustrates one preferred method by which the described composite product may be produced. The apparatus consists of a cylindrical former 19 having stationary interior sections A,A', A'' maintained vacuous by means of suction blower 26, and a traveling foraminous surface element upon which a continuous stratum of flock 12 is deposited in random orientation by flocking gun 18$^a$ and conveyed peripherally into conjunction with an extruded film of polyethylene 16, which combine at the nip with an extruded layer of adhesive 11, the composite 10$^a$ being cooled and thus firmed by transfer of heat to the chilled roller 21, thence withdrawn at the couch roller 22 and wound at 23.

The foraminous surface of the former 19 permits vacuous communication through its periphery between each of the internal chambers A,A', A'' in sequence and the stratum of flock 12 being conveyed motionably thereon into the converging nip formed with the roller 21, which is juxtaposed the vacuous conveyance and comprises a web support member. The peripheral, motionable element of the traveling conveyance perferably comprises a woven wire mesh in the range of type, construction and specification used in paper manufacture, to which it is related in function and design. Since the mesh is designed to maximize liquid flow, the apertures are much larger than the cross-sectional diameter of the flock but smaller than the length of its segments.

The series of vacuous chambers within the cylindrical former 19 is considered beneficial since it affords functional selectivity of vacuous intensity among the several chambers. Normally the highest vacuum would be maintained within the first section A over which the flock is first deposited, thus encouraging its collection on the periphery of the conveyance; thence an intermediate level in the next adjacent section A' serves to hold the deposited stratum of flock securely on the periphery as it transits this chamber and prevents it from being dislodged or windaged out of position at high speeds. The following station A'', positioned immediately upscreen from the apex of the combining nip, may be low-suctioned controllably so that the penetration of the semifluid film 16 into the deposited stratum of flock 12 be subject to adjustment as a function of vacuous intensity. Differentials between the vacuous levels of the several chambers are suggestively indicated by restrictive porting 27 thereamong, it being apparent that the desired levels may be maintained by any suitable means. Downscreen from the apex of the nip a section B within the former 19 may be internally pressurized, thus aiding release of the composite web 10$^a$ from its fibrous attachment thereto and coincidentally clearing the screen of all fibrous material continuously at it transits the pressure chamber B.

Each of the extrusion heads 20, 17 should be positionable horizontally fore and aft relative to the nip tangent as suggested by the phantomed alternate extreme positions shown in FIG. 3, to provide the widest range of utility made practical by this invention. It also is advantageous that vertical adjustment of the head assembly be provided in the traditional manner and to comparable ends. Thus, except as limited in close proximity by mechanical considerations, each of the nip-drawn films 16, 11 may contact its respective first support 12/19, 21 at a variable distance upweb from the apex of the nip including, at its inward limit, crossing the nip tangent to make first contact with the opposite film.

By such means it will be apparent that the receptivity of the film 16 for the apposed portion of the stratum of flock 12, and continuing during the interval of conjunction therebetween upweb from the apex of the nip, is controllable as a function of viscosity at the temperature(s) extant during said interval. It also will be understood by those knowledgeable of heat transfer phenomena that the several interfacial temperature gradients within the composite 10$^a$ are subject to considerable variation by utilizing the heat sink capacity of the chilled roller 21 and varying the interval of contact therewith, recognizing that both film and adhesive layers of the types herein described are relatively poor conductors of heat and therefore constitute insulating layers wherein the interfacial gradients can be significant in spite of their shallow depth, and taking further into account that at normal extrusion speeds said intervals measure in milliseconds.

It is our purpose that the apparatus as designed be capable of controlling the amount of flock securely attached to the formed base by a combination of means, including the temperature of the film 16 during the interval of conjunction, the length of such interval, the vacuous level within the former applicable to their conjunction, and the density of the initial deposit on the screen; it being further possible to meter the original deposit and so to control the other variants that all the deposited flock will become attached to the thermosensitive surface. The alternate approach, being that which is illustrated, is to apply the flock 12 in excess to the former 19, thereby permitting partial attachment to and random removal by the web 10$^a$ as controlled by the described variants, the excess being blown off the screen at B as indicated and thence deflected at 31 back under the leading vacuous chamber A where it is redeposited. Air nozzle means 29 for removing loose flock is provided downweb on the underside of the chilled roller 21, and thence deflected into the reapplication passage 30. A final cleaning of the finished surface 13 may be accomplished by vacuum snout 28 and passed through the centrifugal blower 26$^a$ which is shown to power the pressure nozzle 29, thereby returning at C all the separable fiber segments to the former 19.

It is observed that compressive wringer nips are customary in extruding planar polyethylene film wherein the wringer roll surfaces may be imaged faithfully in those of the film. Similarly the lamination thereof concomitantly with paper utilizes the compressive nip for purposes of assuring interfacial contact as well as to control the rate of withdrawal of the extruded film. In the present invention however it should be noted that the fine screen construction of the foraminous conveyance introduces stringent limitations upon the compressive force obtainable at the converging nip. Thus in the development of the concept it was recognized that supplemental means to induce the desired degree of embedment and/or to control its uniformity would be most beneficial if not essential, whence the described variants are relied upon principally in lieu of nip pressure per se.

It is advantageous in some applications that means be provided for maintaining a wetted surface on the web support roller 21 to facilitate separation at the takeoff roller 22, or for applying a purposeful finish coating material to the face of the composite article opposite the flocking. One such means comprises a fountain 24 as illustrated in FIG. 3. Other recognized means include doctoring or spraying of liquid compositions, dusting with dry particulate material(s) or condensing a vaporous substance (e.g., water, alcohol, ether, etc.) on the chilled surface.

Any suitable form of adhesive or other composition can be introduced into the composite article, wherein it may comprise one of a plurality of layers of the formed base or be construed an undersurfacing thereof or of a composite which may include an interposed web. Such a composition may be applied by extrusion, curtain coating, one of the methods just described or by a combinations of means compatible with handling the composite, or it may be introduced in web form. Bearing in mind the preferred adhesive described in the referenced U.S. Pat. No. 3,502,207, it will be apparent that the rapid chilling of the exposable surface of the adhesive layer 11 against the chilled roller 21 causes the adhesive surface to be non-receptive of the flocked backfacing 13 of the wound composite 10$^1$, thereby discouraging envelopment of the contacting fibers and permitting their release from the semiactive surface when the composite is unwound from the roll.

The processing techniques and apparatus herein described are similarly applicable to the attachment of a flocked covering to an extruded film or other formed base having an adhesionable surface transiently receptive of a mergeable portion of said covering. The composite article also may include a suitable backing web 33 introduced in the manner illustrated in FIG. 3, with or without an adhesive layer interposed.

FIG. 4 shows a similar extruder 20 which ribbons a film layer 16 against the chilled roller 21, the outersurface of said film thence being subjected to forceful intrusion of randomly oriented fiber segments 12 propelled thereagainst by the flocking gun 18[a], the composite web thence being compression roller at 32 and thereafter withdrawn tensionally from the chilled roller 21, it being understood as in the prior illustration that suitable means for rewinding and removal of excess unattached flock are provided. It also will be apparent, as suggested by the phantomed uproll extrusion head 17, that the illustrated technique is applicable to dual extrusion of dissimilar compositions 16, 11 as in the prior example. Other forms applicable to this process include electrostatic transfer of flock to the receptively conditioned film and various combinational means involving nonmetallic screen conveyance with electrostatic inducement, in which the oppositional windage factor may be minimized by rarification of the obstructing air or by inclusion of jetted propellant, thereby permitting higher operational speeds than otherwise might obtain.

FIG. 5 is illustrative of the construction developed by the preferred process, wherein the fibrous mass 13 is randomly matted and deeply imbedded within the elastomer 16. It will be apparent that by the use of the variants herein described, the admixture of fibers and polymer is subject to control and great latitude. Thus, by deeper embedment each of the elements tends more to reinforce the other, thereby increasing the tensile strength of the composite web. Conversely, shallow penetration will cause such composite more to resemble the distensible characteristics of the film per se. It further will be apparent that whereas polyethylene film surfaces tend to be more adhesionable with oxidized, e.g., developable by air contact at elevated extrusion temperatures and varied by altering the interval of such contact prior to chilling, the anchorage of flocking as herein described in unneedful of such adhesional enhancement in consequence of its root embedment and proportionate envelopment within the elastomer. Insofar as we have been able to discover, exceedingly small amounts of polyolefin films have been flocked, which we believe is due in large measure to the difficulties encountered therein and to the excessive cost of processing by utilization of the known techniques by which flocking customarily is done.

In producing protective coverings of the types to which this specification is primarily directed, uniformly elongate flock selected from the range of about 1/16 to 5/32 inch in length appear best adapted. Although shorter segments (e.g., 1/32 inch) are applicable by means of vacuous screen conveyance, their contribution to reinforcement dimishes as an inverse function of length combinedly with the depth of embedment in the form base. Similarly there is no bar to the application of longer segments of fiber or filaments by the means of this invention whereby an exceedingly hairy surface may be developed or, by maximal embedment within the formed base, an exceptionally strong film can be processed wherein the fibrous segments are almost completely shrouded, which of course can be achieved with virtually any length of fiber or filament by increasing the vacuous intensity applicable to their conjunction and further influenced by the fluidity of the base per se.

It will be apparent that certain of the elements as described explicitly in the preferred embodiments are not germane to the invention herein disclosed as to form, among which the following are noted.

a. The traveling conveyance 19, although comprising an endless foraminous periphery, need not necessarily be cylindrical as attest the variety thereof used as formers in the manufacture of paper and nonwoven webs.

b. Although it is highly advantageous that vacuous communication with the transiting stratum of flock be continuous from the point of deposit to the apex of the converging nip and that the described functions be effected, the number of internal chambers or suction boxes and their proportionate peripheral areas is a matter of choice, inclusive of utilizing the described function of section A''. Similarly, use of the pressurized section B is optional.

c. Means for depositing the stratum of flock on the periphery of the traveling conveyance other than by flocking gun are deemed to be included generally in this disclosure. Although a maximum of random orientation is considered beneficial for protective coverings of the type and purpose herein described, some degree of grain-direction linearity is to be expected as a function of speed and fiber length. It will be recognized that this is indeed compatible with the use of a screen former, and conversely that predominantly vertical orientation of the flock would be contraindicated therewith.

d. The juxaposed web support member 21, although preferably curvilinear, need not necessarily be cylindrical or comprise a roller per se; nor is it essential in all cases that its web-supporting surface be motionable, e.g., a backing web 33 may be drawn around a stationary support so shaped as to provide an ideal contour which could differ radically from that of a round cylinder.

e. Although heat transfer is essential in handling thermoplastic materials as described in the preferred embodiments, the application of flock utilizing a vacuous traveling conveyance in combination with a converging nip does not require that the attachment necessarily be firmed by cooling.

f. When handling thermoplastic materials, the heat sink capacity of other contacting elements introduced into the composite may indeed be more effective due to proximity than chilling the web support member itself, wherefor heat transfer is germane to this species rather than chilling the support member per se.

We claim:

1. In a process for preparing a flocked composite article comprising a formed base having a discrete covering of flock disposed on one surface, said process comprising the steps of a. introducing said base with said surface transiently receptive of a mergeable portion of said covering to effect adhesional attachment, b. advancing said base as described toward a converging nip comprising a traveling conveyance and a web support member juxtaposed, c. depositing a stratum of flock upon the periphery of said conveyance, d. securing said stratum transiently thereon by vacuous means communicative through said periphery, e. motioning said stratum toward said nip, f. merging said portion with said surface while in its receptive state adjacent said nip, g. passing the composite through said nip, and h. withdrawing said article uninterruptedly.

2. A process according to claim 1, including the steps of applying a disparate composition on the face of said member, and advancing it through said nip.

3. A process according to claim 1 wherein said surface is thermosensitive and the process includes the step of cooling and thus firming said surface.

4. A process according to claim 3 wherein said formed base comprises a thermoplastic composition and the process includes the step of extruding a film of said composition concomitantly.

5. A process according to claim 1, including the step of merging said portion with said surface upweb from the area of conjunction were each contoured opposedly by said nip.

6. A process according to claim 5, including the step of inducing said merging by said vacuous means.

7. A process according to claim 1 wherein said formed base comprises a plurality of layers and the process includes the step of joining two said layers adjacent the nip.

8. A process according to claim 7, including the step of joining said two layers at a point disparate from that at which said portion and said surface make contact.

9. A process according to claim 1, including the step of advancing a continuous web into conjunction with the other surface of said base adjacent the nip.

10. A process according to claim 9, including the step of making said conjunction at a point disparate from that at which said portion and said one surface make contact.

11. An apparatus for preparing a flocked composite article comprising a formed base having a discrete covering of flock disposed on one surface, said surface being transiently receptive of a mergeable portion of said covering to effect adhesional attachment, said apparatus comprising, and in combination:

a means to introduce said base having said surface receptive as defined, b. converging nip means comprising a traveling conveyance and a web support member juxtaposed, c, means to deposit a stratum of flock upon the periphery of said conveyance, d. vacuous means communicative through said periphery to secure said stratum transiently thereon, e. means to motion said periphery toward said nip, f. means to merge said portion with said surface adjacent said nip, g. means to pass the composite through said nip, and h. means to withdraw said article uninterruptedly.

12. The apparatus as claimed in claim 11, wherein said periphery comprises a screen mesh having apertures larger than the cross-sectional diameter of said flock but smaller than the length thereof.

13. The apparatus as claimed in claim 11, including application means to coat the face of said web support member.

14. The apparatus as claimed in claim 11, including extrusion means to introduce said base, and cooling means adjacent said nip to film said surface.

15. The apparatus as claimed in claim 14, including adjusting means to position said extrusion means selectively relative to the nip tangent.

16. The apparatus as claimed in claim 14, including dual extrusion means to introduce said base in two film layers.

* * * * *